Feb. 24, 1925.
W. C. CHAPMAN
1,527,249
UPHOLSTERED FURNITURE, VEHICLE SEAT, MATTRESS, AND THE LIKE
Filed Jan. 24, 1923
2 Sheets-Sheet 1
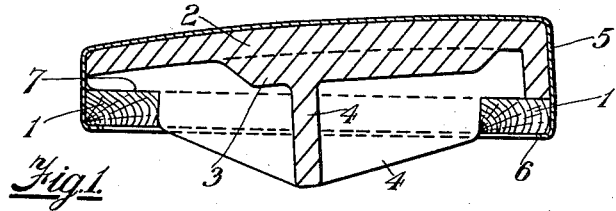
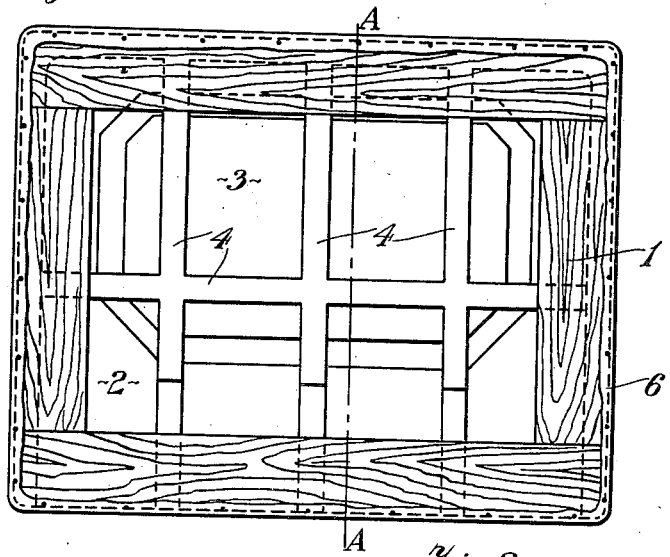
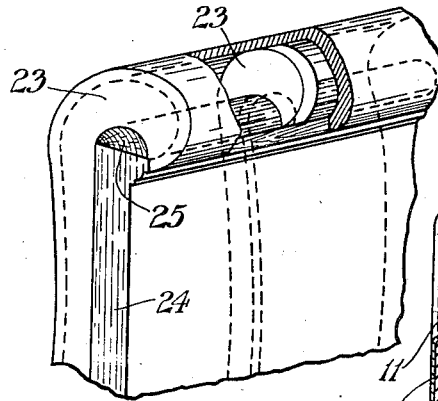
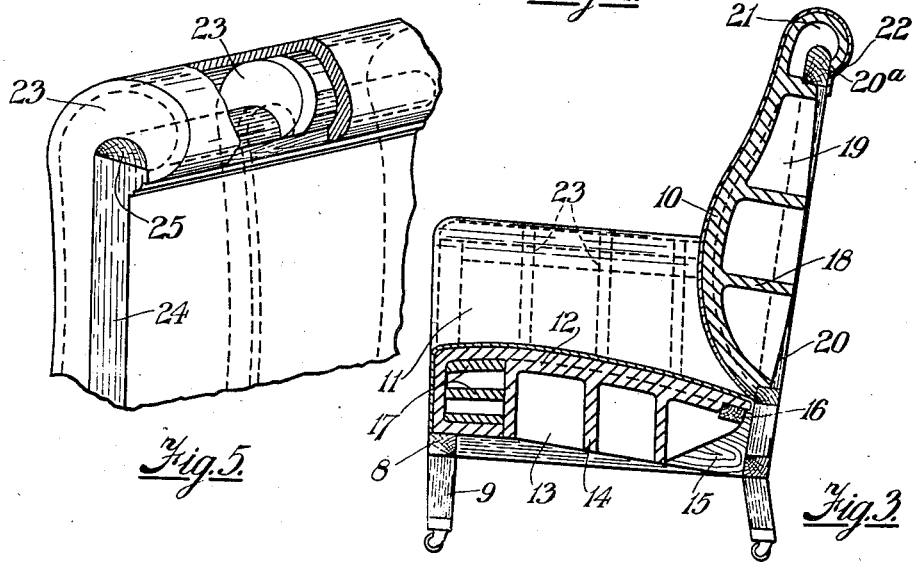
Inventor.
William Charles Chapman
By B. Singer, Atty Feb. 24, 1925.

W. C. CHAPMAN 1,527,249

UPHOLSTERED FURNITURE, VEHICLE SEAT, MATTRESS, AND THE LIKE

Filed Jan. 24, 1923    2 Sheets-Sheet 2

Inventor
William Charles Chapman,
By B. Singer, Atty

Patented Feb. 24, 1925.

1,527,249

UNITED STATES PATENT OFFICE.

WILLIAM CHARLES CHAPMAN, OF WOODFORD, ENGLAND.

UPHOLSTERED FURNITURE, VEHICLE SEAT, MATTRESS, AND THE LIKE.

Application filed January 24, 1923. Serial No. 614,701.

*To all whom it may concern:*

Be it known that I, WILLIAM CHARLES CHAPMAN, a subject of the King of Great Britain, residing at "Deepdene," Kings Avenue, Woodford, in the county of Essex, England, have invented new and useful Improvements in Upholstered Furniture, Vehicle Seats, Mattresses, and the like, of which the following is a specification.

This invention relates to upholstered furniture, vehicle seats, mattresses and the like articles wherein resilient means are employed to cause a return to normal shape and condition after use.

The object of the invention is to simplify the construction of articles such as those above referred to by avoiding the use of springs and stuffing materials as ordinarily employed and utilizing instead porous or spongy india rubber, thereby providing a seating or mattress material of greater durability, of more hygienic nature and one whose resilient qualities are more lasting than those of materials hitherto in use.

The invention consists briefly in a body of rubber sponge adapted to form a seat or seating moulded to give resiliency when operatively positioned. The resilient seating may consist in one piece or an aggregation of pieces positioned within or upon a supporting or confining framework and is preferably formed on its under side with ribs, webs or flanges moulded in one piece with the main body of the seat and which may intersect to form a resilient cellular body.

Reference will now be made to the accompanying drawings which illustrate by way of example constructions according to the invention and in which:—

Figure 4:
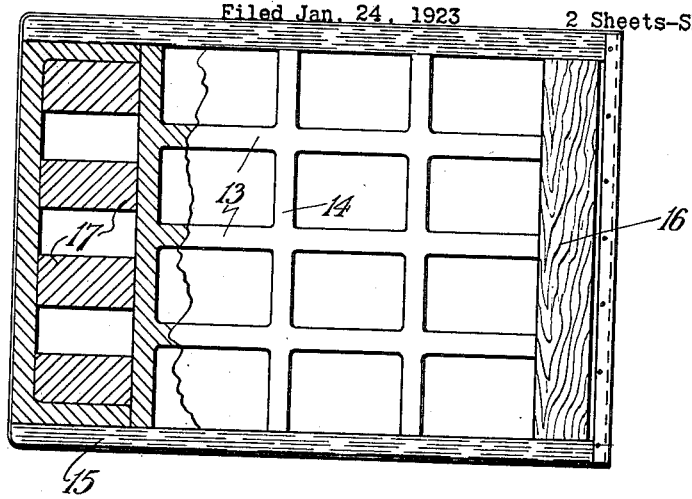
Figure 7:
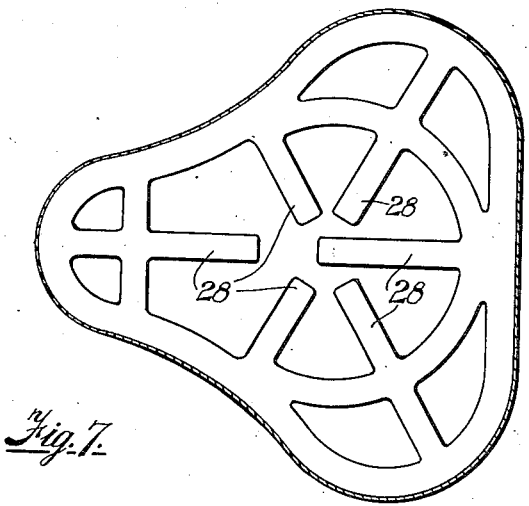
Figure 6:
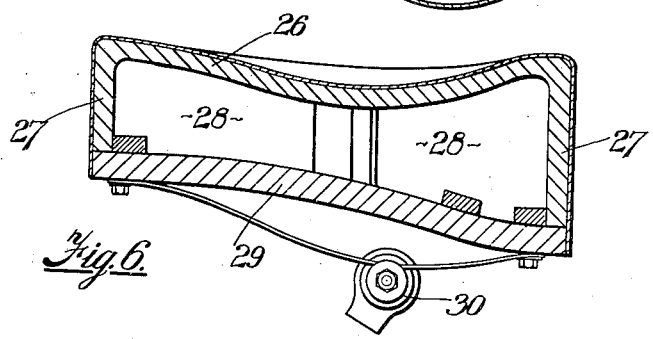

Figure 1 is a sectional elevation of a seat suitable for theatres and the like, the section being taken on the line A—A of Figure 2, Figure 2 is a bottom plan of the seat shown in Figure 1, Figure 3 is an elevation, partly in section, of an arm chair, Figure 4 is a bottom plan of the seat of the chair shown in Figure 3, Figure 5 is a perspective view, partly in section, of the arm of the chair shown in Figure 3, Figure 6 is a sectional elevation of a cycle saddle and Figure 7 is a bottom plan of Figure 6.

Referring first to Figures 1 and 2 the seat comprises a framework 1 of wood or other suitable material upon which is mounted a substantially flat sheet of porous or spongy india rubber 2 which preferably increases in thickness towards its central portion 3 and is provided with strengthening ribs or webs 4 which are shown as extending at right angles the one to the other but which may be formed in any other convenient relative disposition to form a cellular body. The india rubber may be mounted on to a coating 5 of canvas of sufficient size to leave a free edge 6 for protecting the edges of the seat and which serves also for attachment of the seat to the framework 1. The canvas may be omitted in applications where an outer textile or leather covering is employed. The ribs 4 are provided with recesses 7 the edges of which engage the upper and inner surfaces of the members of the framework 1, the arrangement being such that the ribs 4 are held in a state of compression to produce the desired convexity in the upper surface of the seat. The frame members 1 act also as abutments against which the ribs 4 are compressed when the seat is in use, the reaction which occurs owing to the elasticity of the india rubber when the seat is vacated acting to restore the seat to its initial shape.

The principle of construction embodied in the seat above described is applicable to seats of all kinds, an example of an easy chair or settee construction being shown in Figures 3–5 in which the seat may be formed as a fixed or removable unit, which, when in operative position, is inclined downwardly towards the back of the chair. The seat is constructed with a wooden framework 8 to which are secured the legs 9 and the frameworks of the back 10 and arms 11 hereinafter described. A unit of moulded india rubber 12 having intersecting ribs 13 and 14 formed on its under side is fitted over the framework 8 and secured thereto. The sides of the seat are formed by wooden members 15 extending upwardly from the frame 8 and connected towards the rear of the seat by a rail 16 over which the sheet of rubber 12 extends. To impart additional resiliency to the front edge of the seat, this edge is preferably reinforced internally by a number of blocks 17 of india rubber arranged in one or more rows with air spaces between adjacent blocks. If more than one row is employed, as shown in Figure 4, the blocks are staggered in relation to those in the rows above and below. The chair back 10 may take a variety of shapes, according to the depth of the intersecting ribs 18 and 19 which project from its inner surface into engagement with the wooden members 20 of the back frame, the method of engagement with the frame members being familiar to that described with reference to Figures 1 and 2. The upper ends of the ribs 19 which lie in vertical planes may be shaped as shown at 21, Figure 3, to produce a "roll" effect at the top of the chair back and to maintain the india rubber securely in this position the canvas backing 22 or the edge of a fabric, leather or like covering or both may be secured to the upper horizontal rail 20ª of the back framework 20.

A construction suitable for the arms of the chair above described is shown in Figure 5 wherein the canvas coated india rubber is formed with internal strengthening ribs 23 disposed vertically and is curved around a wooden framework 24 to the upper inner edge of which the free edge of the canvas is secured. To preserve the correct curvature of the upper edge of the arm the ribs 23 at this point may engage a partially circular rim 25 formed along the upper edge of the framework 24 or the ribs may be formed of solid semi-circular shape at this point and, to impart additional resiliency to the arm, may rest on blocks of india rubber secured to the upper edge of the framework 24.

Figures 6 and 7 illustrate the application of the invention to a bicycle saddle, the under surface of the saddle 26 being formed with a downwardly extending peripheral flange 27 and with curved and radial ribs 28. The flange and ribs are secured to a base 29 of wood, metal or the like which is preferably formed on or has secured to its under surface, a metal or like member 30 for attachment to the bicycle frame.

The invention may be applied also to the construction of pillion seats for motor bicycles and to railway, tramway and other vehicle seats, the construction described in connection with Figures 1 and 2 being applicable for all of these purposes with such modifications as may be necessary in regard to the ratio between length and breadth or a number of the seats shown in Figures 1 and 2 may be employed disposed end to end in a suitable framework to form a tramway or like seat.

In constructing a box mattress according to the invention, the upper flat surface of moulded spongy india rubber is provided with side flanges and with vertical ribs depending from its under side. The space enclosed by the rectangular frame members of the mattress is crossed by laths in the usual manner, both frame members and laths being formed with grooves for the reception of the edges of the india rubber flanges and ribs.

In all of the constructions herein described the canvas covering may form the wearing surface of the seat or mattress, although leather, textile fabrics or any other usual covering materials may be employed for the purpose and may be secured over the canvas by ordinary means.

I claim:—

1. A resilient seating device comprising a supporting framework and a body of rubber sponge having an under surface formed with intersecting ribs provided with recesses, the edges of which recesses engage the upper and the inner surfaces of the members of said framework.

2. A resilient seating device comprising a supporting framework, a body of rubber sponge having a lower surface formed with intersecting ribs or flanges increasing in depth towards the central portion of said body and provided with recesses, the edges of said recesses engaging the upper and inner surface of the members of said framework.

In witness whereof I affix my signature.

WILLIAM CHARLES CHAPMAN.